(12) United States Patent
Haes et al.

(10) Patent No.: US 6,182,343 B1
(45) Date of Patent: Feb. 6, 2001

(54) FILTER CLOTH CAULKING TOOL

(75) Inventors: Robert Lawrence Haes, Braunschweig; Hans Joachim Pipes, Salzgitter, both of (DE)

(73) Assignee: Scapa Group PLC, Blackburn (GB)

( * ) Notice: Under 35 U.S.C. 154(b), the term of this patent shall be extended for 0 days.

(21) Appl. No.: 09/308,247

(22) PCT Filed: Oct. 17, 1997

(86) PCT No.: PCT/GB97/02870

§ 371 Date: Jul. 16, 1999

§ 102(e) Date: Jul. 16, 1999

(87) PCT Pub. No.: WO98/23354

PCT Pub. Date: Jun. 4, 1998

(30) Foreign Application Priority Data

Nov. 23, 1996 (GB) .................................................. 9624412

(51) Int. Cl.[7] ...................................................... B23P 19/04

(52) U.S. Cl. .............................. 29/235; 269/288; 29/278; 29/281.1

(58) Field of Search ............................... 269/288; 29/235, 29/278, 281.1, 448

(56) References Cited

U.S. PATENT DOCUMENTS 4,307,503 * 12/1981 Auld et al. ............................. 29/448

* cited by examiner

*Primary Examiner*—David A. Scherbel
*Assistant Examiner*—Lee Wilson
(74) *Attorney, Agent, or Firm*—Jacobson, Price, Holman & Stern PLLC

(57) ABSTRACT

A caulking tool (20) comprises mechanisms (24, 25, 26, 27) for temporarily securing the tool to a filter plate and a pivotally operable caulking body (29, 30, 31) which urges a caulking rope into a groove in the filter plate so as to capture a part of the filter cloth therein. This secures the filter cloth to the filter plate.

5 Claims, 1 Drawing Sheet

FILTER CLOTH CAULKING TOOL

BACKGROUND OF THE INVENTION

Field of the Invention

The present invention relates to a filter caulking tool.

Some types of filter apparatus, such as filter presses comprise a number of filter plates. Conventionally, both sides of the filter plate are covered with a filter cloth. A central feed hole is provided through the plate. This feed hole is unobstructed by the filter cloth. A connecting device passes through the feed hole connecting the two filter plates. One such arrangement is shown in GB 2088231. The filter cloths need to be secured to the periphery of the filter plates. In some presses a rubber seal is provided between adjacent plates and the cloths are caulked into a groove in the plate which is located just outside the filter area, but within the seal area. A tool is required to achieve this caulking.

Caulking is traditionally achieved by forcing a rope or cord into a groove containing a peripheral region of the filter cloth. This method is very slow and labour intensive in that two people are required for each caulking operation. One is required to hold the cloth in the right position and another is required to caulk the filter. The fact that a press plate will generally need to be removed from the press and laid flat to be caulked, and then turned over and laid flat to install the filter cloth on the other side, makes the known method even more slow and cumbersome, the plates usually being large and heavy. Filter cloths are also often easily damaged by the wedge or hammer. The known caulking method is also a common cause of injury to workers installing the filters, mainly to the band fingers or elbow or wrist ligaments since the rope must be tightly fitted to ensure that it stays in the groove when the filter cloth distorts due to high flow pressures. The fact that workers often have to kneel down to caulk the filters also results in potential back injuries or strains.

The present invention has been made from a consideration of these problems.

SUMMARY OF THE INVENTION

According to the present invention, there is provided a caulking tool comprising means for temporarily securing the tool to a filter apparatus and a pivotally operable caulking body for urging a retaining member into a groove in the filter apparatus so as to capture a part of a filter cloth therein and thus secure the filter cloth to the filter apparatus.

The above referenced apparatus may be used to successfully and speedily caulk a filter cloth to a filter press plate by a single operation with less physical exertion and with a much reduced risk of injury. The apparatus also usually facilitates a better fit of the cloth into the groove of a filter plate.

The means for securing the tool to the filter apparatus preferably comprises a clamp. The tool may be clamped into position on the plate by any standard technique, such as by one or more screw clamps.

The tool preferably comprises a guide body, such as a bar or rod, along which the lever operable caulking body travels in an axial direction parallel to the filter plate groove. The caulking tool preferably comprises a bracket which is connected to the guide body so as to facilitate travel along the guide body. Each end of the guide body is ideally secured to the filter plate, preferably at the plate ends. The ends of the guide body may be secured to parts which are held in an external clamp. This tool can be fixed onto the top, bottom sides or corners of any filter plate. This allows just one person to caulk a filter, with one hand operating the lever and the other hand free to hold the cloth in the correct position.

The caulking body preferably comprises a foot for engaging the retaining member and a handle, which acts as a lever for the foot. The lever preferably pivots about the guide body in a direction perpendicular to the axial direction of movement for the lever. As the lever is pulled towards the operator and away from the plate, in a direction perpendicular to the groove, the base section of the lever is urged toward the plate and into the groove, pressing in the rope and filter cloth.

A further advantage is that the tool may be mounted on a stand outside the press and revolve around the filter plate to follow the groove. Therefore, cloths may be fitted without removing the plate.

The rope or other retaining member being caulked may be loose on top of the cloth or temporarily bonded to it, for example, by sewing, adhesive or pins, or it may be sewn into a hem or false hem around filter cloth periphery.

The guide body may be of any length corresponding to the length of grooves normally found in press plates. The lever foot may be wedge-shaped or T-shaped. The lever, bracket and foot are ideally an integral part. Most of the lever preferably lies about the guide body so that less physical effort is needed to caulk the cloth effectively.

The components may comprise any material, although metal, such as steel, is preferred.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

In order that the present invention may be more readily understood, specific embodiments thereof will now be described by way of example only and with reference to the accompanying drawings in which:

DESCRIPTION OF THE INVENTION

Figure 1:
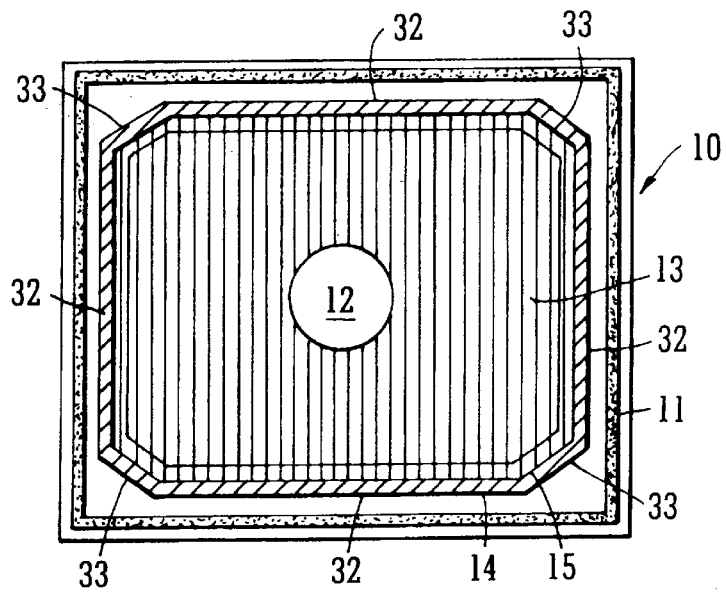
FIG. 1 is a side elevation of a typical filter press plate on which the caulking tool of the present invention may be used.

Referring to FIG. 1, a filter plate 10 for a filter press has two main faces only one of which is illustrated. A rubber seal 11 is provided around the periphery of the filter plate 10. An aperture 12 is provided though the centre of the filter plate 10. A filter cloth is provided on each main face of the filter plate 10. The two filter cloths, only one of which 13 is shown, are connected via a tubular barrel neck that extends through the aperture 12 in the filter plate.

A groove 14 is provided in each main face of the filter plate. The filter cloth 13 on that face of the filter plate lies over that groove. A caulking rope 15 is then placed over the cloth and groove in a position which is in register with the groove. The rope is then urged into the groove so as to capture the filter cloth 13 on that side of the filter plate. The rope 15 is urged into position by the caulking tools which are illustrated in FIGS. 1 and 2.

Figure 2:
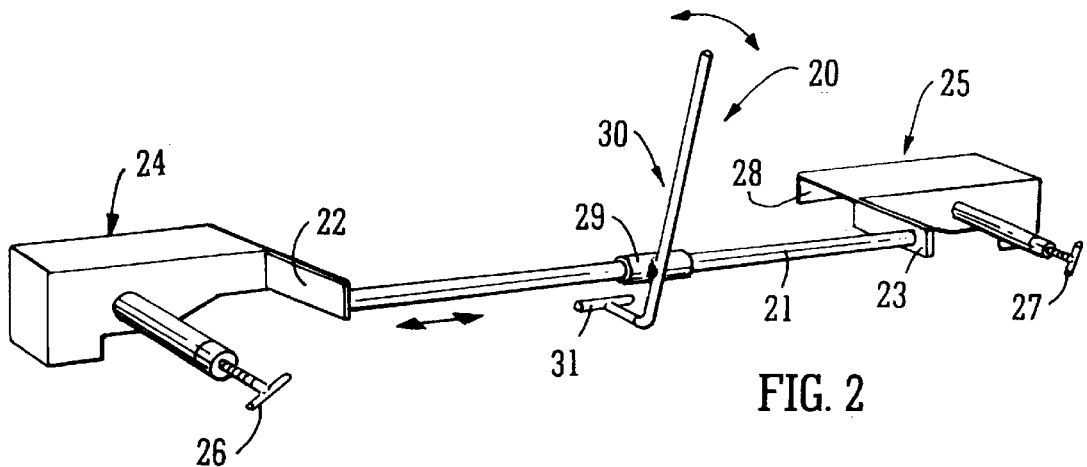
FIG. 2 is a perspective view of one caulking tool of the present invention.

Referring to FIG. 2, a caulking tool 20 comprises a bar 21, the ends of which are each secured to a flange 22,23. Each flange 22,23 is secured to an open box section 24,25 which is operative to be received over a corner of the filter plate 10. In use, the two box sections 24,25 are received over adjacent corners of the filter plate 10 and the apparatus is thus secured in place by spring-loaded locating screws 26,27 which are urged towards the filter plate 10, the filter plate 10 being retained between the rear walls only one of which 28 is illustrated, of the box sections 24,25 and the end of the spring-loaded located screws 26,27.

A short tube 29 is received over the bar 21 such that it can slide along the length of the bar 21. A long rod 30 is secured to the short tube 29, a short T-shaped rod 31 extending from the base of the long rod 30 substantially perpendicular thereto. The short T-shaped rod 31 may be pivoted about the bar 21 by securing the short tube 29 about the bar 21.

In use the caulking tool is secured in position such that the end of the T-shaped rod 31 is in register with the caulking rope 15. The end of the T-shaped rod 31 may be used to urge the caulking rope 15 into position by pulling on the end of the long handle 30 so as to pivot the T-shaped rod 31 towards the rope 15 and thus urge it into the groove 14. Different parts of the caulking rope 15 may be urged into position by first moving the short tube 29 along the bar 21 and then appropriately moving the T-shaped rod 31 into position.

Figure 3:
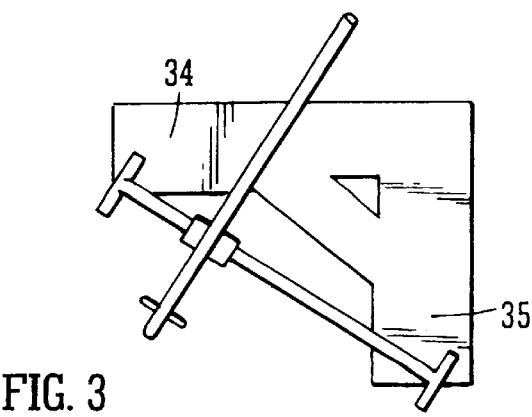
FIG. 3 is a plan view of a second caulking tool of the present invention.

The apparatus of FIG. 2 is used to move the caulking rope 15 into position in the long sections 32 of the filter plate groove. The caulking rope 15 may be caulked into position in the short angled sections 33 by a similar apparatus as illustrated in FIG. 3 having corner box section 34,35 operative to bring the T-shaped rod 31 into register with these short sections 33.

It is to be understood that the above described embodiments have been made by way of illustration only. Many modifications and variations are possible.

The invention being thus described, it will be obvious that the same may be varied in many ways. Such variations are not to be regarded as a departure from the spirit and scope of the invention, and all such modifications as would be recognized by one skilled in the art are intended to be included within the scope of the following claims.

What is claimed is:

1. A caulking tool comprising means for temporarily securing the tool to a filter apparatus and a pivotally operable caulking body for urging a retaining member into a groove in the filter apparatus so as to capture a part of a filter cloth therein and thus secure the filter cloth to the filter apparatus, the tool further comprising a guide body for guiding travel of the caulking body, the caulking body comprising a bracket which is connected to the guide body so as to facilitate travel along the guide body.

2. The caulking tool as claimed in claim 1, wherein the filter apparatus is a filter press plate.

3. The caulking tool as claimed in claim 1, wherein the means for securing the tool to the filter apparatus comprises a clamp.

4. The caulking tool as claimed in claim 1, wherein the tool futher comprises a guide body for guiding travel of the caulking body.

5. The caulking tool as claimed in claim 1, wherein the caulking body comprises a foot for engaging the retaining member and a handle.

* * * * *